May 29, 1951 W. G. MILLER 2,554,790
FLOW CONTROL DEVICE
Filed Sept. 9, 1948

INVENTOR
WESLEY G. MILLER
BY
Flora G. Miller
ATTORNEY

Patented May 29, 1951

2,554,790

UNITED STATES PATENT OFFICE 2,554,790

FLOW CONTROL DEVICE

Wesley G. Miller, Erie, Pa., assignor to Hays Manufacturing Company, Erie, Pa., a corporation of Pennsylvania Application September 9, 1948, Serial No. 48,390

10 Claims. (Cl. 138—43)

This invention relates generally to flow control devices for controlling the flow of fluid through a pipe line which varies in pressure and temperature. This application sets forth an improvement of the flow control device in my Patent No. 2,460,647.

Before this novel improvement and before the invention disclosed in my prior application, no device had been provided to control the flow of fluid which varied greatly in pressure, through a pipe line, so that a substantially constant flow of the fluid emanated from the outlet end thereof. Resilient cylindrical shaped members having an aperture extending axially thereof which is restricted on an increase in pressure can only control the flow within very wide limits, especially upon a substantial increase in pressure when the control of the fluid is negligible in that the central aperture of the flow control member is directly in axial alignment with the inlet and the outlet of the flow control member and only limited restriction results. Where the central portion of a flow control member flexes downwardly into a larger aperture, the control is likewise negligible at higher pressures because the resilient member quickly reaches its maximum restricted position. These devices become fatigued very quickly and where temperatures vary any appreciable amount, the central apertures vary in size on change in temperature thereby making control practically impossible in such a situation. Furthermore, in all of the prior devices, it has been necessary for the pressure to obtain a predetermined amount before the flow control device would operate to give any control whatsoever.

It is, accordingly, an object of my invention to overcome the above and other defects in flow control devices and it is more particularly an object of my invention to provide a flow control device which is simple in construction, economical in cost, efficient in operation, and economical in manufacture.

Another object of my invention is to provide a flow control device in a fluid line which controls the quantity of fluid passing therethrough regardless of the variations in temperature or pressure of the fluid.

Another object of my invention is to provide a fluid control device in a fluid line which permits maximum flow of fluid while controlling the quantity of fluid passing from the line.

Another object of my invention is to provide a fluid control device in a fluid line which permits control of the flow of fluid from the fluid line at a predetermined extremely low initial pressure.

Another object of my invention is to provide a flow control device which has a maximum useful life and which controls the flow of fluid over wide pressure and temperature changes.

Other objects of my invention will become evident from the following detailed description, taken in conjunction with the accompanying drawings, in which Fig. 1 is a vertical sectional view of a flow control device illustrating a preferred embodiment of my invention;

Figure 1:
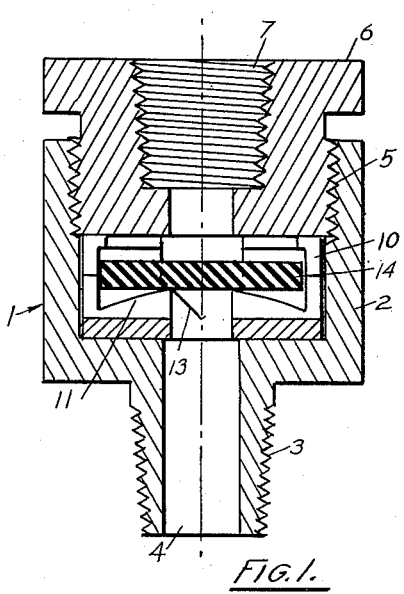
Figure 2:
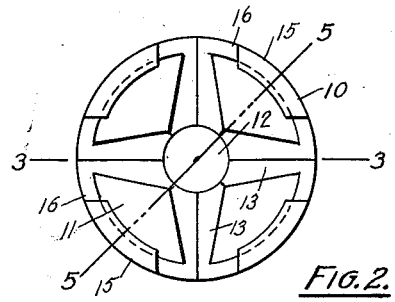
Fig. 2 is a plan view of my novel flow control device with the elastic flow control member removed therefrom.
Figure 3:
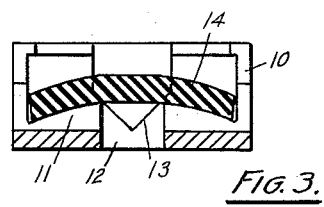
Fig. 3 is a vertical sectional view taken on the line 3—3 of Fig. 2 with a flow control member shown in a flexed or deflected position under pressure.

Referring now to the drawings, I show in Figs. 1 to 6 inclusive, as illustrative of an embodiment of my invention, a flow control member 1 for disposal in a pipe line comprising a cylindrically shaped body 2, an externally threaded extension 3 having an outlet aperture 4, an internally threaded portion 5 for threadably engaging a threaded adapter 6 having a threaded aperture 7 providing an inlet for the flow of fluid into the flow control member 1. An open cup-shaped insert member 10 having a convex face portion 11 with a central aperture 12 for alignment with the outlet 4 in flow control member 1 has radially extending V-shaped grooves 13 extending outwardly from the aperture 12 in the convex face portion 11. A flat, cylindrically shaped resilient, elastic member 14 is disposed over the aperture 12 and grooves 13 in the convex portion 11 of the insert member 10 to control the flow of fluid passing from the inlet 7 to the outlet 4 of the flow control member 1. The insert member 10 has the upper wall portions 15 thereof cut away at 16 to permit lateral flow of fluid from the inlet 7 to pass around the outer side of the resilient member 14 through the grooves 13 and into the aperture 12 to the outlet 4. The aperture 12 is preferably made of a sufficiently greater cross sectional area than the cross sectional area of the grooves 13 to permit the free flow of fluid therethrough. The resilient member 14 is preferably made of a flexible, resilient, elastic material such as rubber, although any other suitable resilient material may be used. My device may even operate as a flow control device within predetermined limits with a flexible metal member 14.

Although I have shown an insert member 10 with a grooved convex surface 11, it will be evident that a grooved convex surface could be provided at the entrance to the outlet 4 and provide the same operation.

Figure 4:
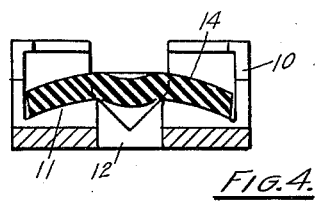
Fig. 4 is a vertical sectional view of my novel flow control device showing the elastic member shown in Fig. 3 under substantially greater pressure with the radially extending passages partially restricted by it.
Figure 6:
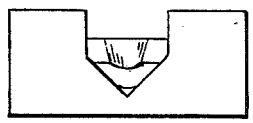
Fig. 6 is a side elevational view of my novel flow control device.
Figure 5:
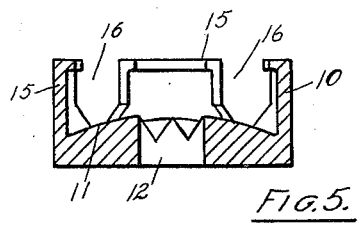
Fig. 5 is a view taken on the line 5—5 of Fig. 2.

In operation, the flow control member 1 is threadably engaged to suitable piping with the inlet pipe attached to the threaded inlet 7 and the outlet pipe threadably attached to the threaded extension 3. A fluid passing downwardly through the inlet aperture 7 strikes the upper side of the resilient member 14 wherein it passes laterally outwardly therearound and through the grooves 13 to the aperture 12 in the insert member 10 to the outlet aperture 4 of the flow control member 1. When the pressure of the fluid is rather low, the outer edges of the resilient member 14 will deflect downwardly to a maximum downward position shown in Fig. 3 thereby gradually restricting the radially extending apertures or grooves 13 leading to the aperture 12. Because of the convexity of the face 11, it will be evident that the cross-sectional area of the grooves 13 decreases as they are covered by the resilient member 14 radially outwardly from the central portion thereof. Inasmuch as there is very little pressure required to deflect the outer free sides of the resilient member 14 downwardly, it will be evident that my flow control device will operate to control the flow of fluid when pressures are as low as five pounds or less per square inch. As the pressure increases, the outer surface of the resilient member 14 is forced downwardly into the grooves 13 as shown in Fig. 4 to restrict the cross-sectional area thereof and provide a barrier to the flow of fluid therethrough. It will be evident that by changing the size of the passages for the flow of fluid in proportion to the increase or decrease in pressure, the flow of fluid can be held constant. My flow control device controls the flow of fluid passing therethrough within very close limits even upon the passage of comparatively large volumes of water under great variations in pressure and temperature of the fluid. Furthermore, because of the small portion of the resilient member 14 being forced into the grooves 13 and because there is some rotational movement of the resilient member 14, there is little change in the elasticity thereof even after it has been in operation for a considerable period of time. Changes in temperature of the fluid will not cause any decrease in efficiency in the control of the flow of the fluid in that the diameter of the resilient member 14 has no effect upon its ability to restrict the grooves 13.

Although I have shown the insert element 10 with a convex surface with radially extending grooves extending from the central aperture therein, it will be evident that radially extending grooves extending from a centrally apertured convex or raised surface may be provided in any similar device without departing from the spirit of my invention. My flow control device will operate where the central portion of the face therein is of greater height than the outer surface so that the cross-sectional area of the grooves decreases upon moving outwardly from the center thereof.

It will be evident from the foregoing that I have provided a novel flow control device which controls the quantity of fluid passing from a pipe line regardless of the changes of temperature and pressure of the fluid passing therethrough and even when the pressure of the fluid passing through the pipe line is as low as five pounds or less per square inch. Furthermore, my novel flow control device has no moving parts and the flexible member therein is designed to provide a maximum life.

Various changes may be made in the specific embodiment of my invention without departing from the spirit thereof or from the scope of the appended claims.

What I claim is:

1. A flow control device for varying pressure fluids comprising a member having an inlet and a convex surface with a central outlet aperture and a radially extending, grooved passage leading outwardly from said aperture, said outlet aperture being greater in cross sectional area than the cross sectional area of said grooved passage, and a resilient member disposed over said outlet aperture and said grooved passage in the path of the fluid passing through said member for controlling the quantity of fluid passing therethrough.

2. A flow control device as set forth in claim 1 wherein said grooved passage is V-shaped with the cross-sectional area thereof progressively decreasing outwardly from the center thereof.

3. A flow control device for varying pressure fluids comprising a member having an inlet and an outlet aperture, an insert member disposed over said outlet aperture having a radially grooved convex portion with a central aperture for alignment with said outlet aperture, a resilient member for disposal over the said aperture in said insert member and said grooved passages therein for controlling the quantity of fluid passing through said member.

4. A flow control device as set forth in claim 3 wherein said insert member comprises a cup-shaped member having the wall portions thereof cut away adjacent the outer ends of said grooved passages.

5. A flow control device as set forth in claim 3 wherein said grooved passages are V-shaped in cross-section with the outer portions thereof of lesser cross-section than the inner portions thereof.

6. A flow control device for varying pressure fluids comprising a member having an outlet end, said outlet end having a convex surface with a centrally disposed outlet aperture and radially outwardly extending tapered grooved passages, and a flat flexible member for disposal over said outlet aperture having the outer portion thereof adapted to deflect downwardly over said grooved passages to progressively restrict said passages to the flow of fluid upon predetermined increases in pressure.

7. A flow control device for varying pressure fluids comprising a member having an inlet and an outlet aperture, an insert member disposed over said outlet aperture having a centrally raised surface with a central aperture for alignment with said outlet aperture, and tapered grooved passages extending radially outwardly therefrom, said insert member being cup-shaped in form and having the terminal portions of said grooves cut away to permit free passage of fluid, and a resilient member for disposal over said aperture in said insert member adapted to be deflected upon an increase in pressure to progressively restrict the cross-sectional area of said passages to the flow of fluid.

8. A flow of control device comprising a member having a centrally apertured convex surface with laterally extending tapered grooved passages leading outwardly from said aperture, and a resilient member for disposal over said aperture having the outer side thereof adapted to deflect downwardly over said grooved passages to restrict the flow of fluid through said grooved passages and having portions thereof also adapted to restrict the cross-sectional area of said passages upon increase in pressure of the fluid.

9. A flow control device comprising a member having a centrally raised surface with a central outlet aperture and V-shaped radially extending passages leading from said aperture, and a round, flat resilient member disposed over said aperture adapted to deflect downwardly to restrict said passages upon an increase of pressure in the fluid flowing through said member, the cross-sectional area of said V-shaped passages decreasing progressively outwardly.

10. A flow control device comprising a member having a centrally raised apertured surface with radially extending, grooved passages, progressively decreasing in cross-sectional area from the center thereof, and a resilient member disposed over said aperture adapted to restrict said grooves to the flow of fluid upon an increase in fluid pressure whereby a portion of said resilient member is deflected into said grooved passages.

WESLEY G. MILLER.

REFERENCES CITED

The following references are of record in the file of this patent:

UNITED STATES PATENTS

| Number | Name | Date |
| --- | --- | --- |
| 2,444,677 | Rosenblum | July 6, 1948 |
| 2,460,647 | Miller | Feb. 1, 1949 |